United States Patent [19]

Hatfield

[11] Patent Number: 4,662,035

[45] Date of Patent: May 5, 1987

[54] WIRE CLAMP

[76] Inventor: Jay D. Hatfield, P.O. Box 969, Bend, Oreg. 97709

[21] Appl. No.: 762,517

[22] Filed: Aug. 5, 1985

[51] Int. Cl.⁴ .............................................. F16G 11/06
[52] U.S. Cl. ................................ 24/135 R; 403/389; 403/391
[58] Field of Search ...................... 24/135 R, 525, 569; 403/391, 389, 390, 396; 256/DIG. 3

[56] References Cited

U.S. PATENT DOCUMENTS

| | | | |
|---|---|---|---|
| 209,233 | 10/1878 | Cox | 24/135 R |
| 342,922 | 6/1886 | Munn | 256/DIG. 3 |
| 479,777 | 8/1892 | Ashworth | 256/DIG. 3 |
| 551,153 | 12/1895 | Beals | 24/135 R |
| 644,011 | 2/1900 | Heatwole | 24/135 R |
| 830,572 | 9/1906 | Cutter | 403/389 |
| 866,876 | 9/1907 | Meech | 403/389 |
| 1,699,211 | 1/1929 | Rose | 403/391 |
| 1,807,462 | 5/1931 | Zehnder | 403/391 |
| 2,426,975 | 9/1947 | Roach | 403/396 |
| 2,552,877 | 5/1951 | Vieriu | 24/135 R |
| 2,790,538 | 4/1957 | Collins et al. | 24/135 R |
| 3,238,496 | 3/1966 | Crowther | 403/390 |
| 3,509,521 | 4/1970 | Gutshall | 403/389 |
| 4,471,159 | 9/1984 | Frank, Jr. | 403/389 |

*Primary Examiner*—Victor N. Sakran
*Attorney, Agent, or Firm*—Paul F. Horton

[57] ABSTRACT

A wire clamp for clamping two wires together. The clamp includes a first member, channel-like in shape, and a second member having a body portion held within the channel of the first member; the body portion being provided with a pair of sharpened ears which overlap the edges of the first member. A threaded bolt-nut assembly clamps the two members together. The clamp is particularly useful for repairing broken fence wires; the two ends of the broken wire being drawn taut between the first and second members and held in position by tightening the nut upon the bolt causing the top surface of the base portion of the first member and the bottom surface of the body of the second member to firmly engage the wires contained therebetween and causing the sharpened ears to engage the wires for crimping the wires.

2 Claims, 4 Drawing Figures

WIRE CLAMP

BACKGROUND OF THE INVENTION

1. Field of the Invention

This invention relates in general to clamping devices and more particularly to clamps operable to hold two ends of a broken fence wire together.

2. Description of the Prior Art

Once a fence wire, as for example barbed wire, is broken it becomes necessary to repair the wire because of loss of livestock and the danger of livestock on the road, as well as for countless other reasons. On a large ranch or spread, there are many repair jobs required over the period of a year.

Because the wire is ordinarily under some tension before breakage, the wire is ordinarily too short to make appropriate loops and twists in each of the wires for repair. The addition of another stretch of wire usually produces too much slack in the wire. Under any circumstance, the process is time consuming and each break can occupy a quarter-hour of a man's time.

Clamps are known for holding a fence wire to a post as typified by U.S. Patent office No. 342,922 issued to S. J. Munn and clamps are known for holding two wire portions as typified by Hawser clamp of R. Ashworth, U.S. Pat. No. 479,777. The Munn clamp is operable to hold a single wire and then only by means of a single groove, a portion of which is included on each section of the clamp. The groove is formed to fit a particular size of fence wire. The clamp is unsuitable for the mending of fence wires. The Hawser clamp of Ashworth is provided with a pair of grooves, also shaped to fit a particular size wire; is costly to construct and therefore impractical for the purpose of fence repair, and clamps the wire or wires with a force being applied in one direction only, thereby allowing slippage of the wires.

SUMMARY OF THE INVENTION

The present invention overcomes these problems by providing a clamp which is not costly; which will accommodate conventional fence wire of any size; and which engages the wires by clamping action in one direction and a crimping action in another direction. The invention comprises generally a channel-shaped first member and a second member dimensioned to fit within the channel to clamp wires placed between the members. The second member also includes a pair of sharpened ears which are operable to crimp the wires over the edges of the first member. The first and second members are held together by a threaded nut-bolt assembly. A more thorough description may be found in the appended claims.

It is therefore a general object of the present invention to provide a simple, cost-efficient means for repairing fence wires.

It is also an object of the present invention to provide a wire clamp which will accommodate any size and shape of conventional fence wire.

It is further an object of the present invention to provide a simple wire clamp which engages fence wires so as to both clamp and crimp the wires.

More specifically, it is an object of the present invention to provide a clamp having a channel member for receiving the ends of broken fence wire and second member having sharpened ears for crimping the wires to prevent slippage.

Additional objects and advantages will become apparent and more thorough and comprehensive understanding may be had from the following description taken in conjunction with the accompanying drawings forming a part of this specification.

DETAILED DESCRIPTION OF THE INVENTION

Figure 1:
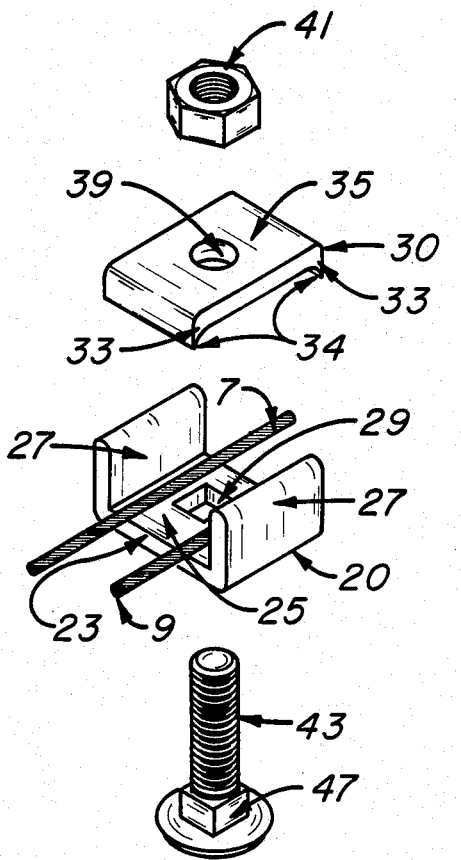
FIG. 1 is an exploded perspective view of a preferred embodiment of the wire clamp, showing placement of wires.
Figure 2:
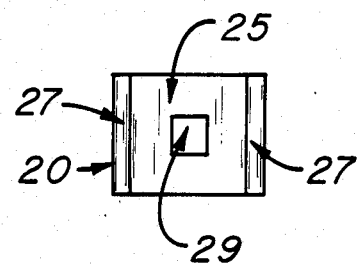
FIG. 2 is a plan view of the first member.
Figure 3:
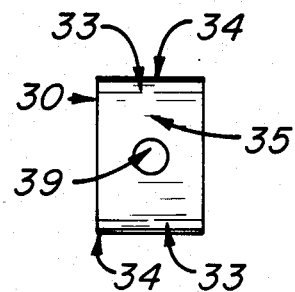
FIG. 3 is a bottom view of the second member.

Referring to the drawings, an embodiment to be preferred of wire clamp 10, made according to the present invention is disclosed. Clamp 10 includes a first member 20, a second member 30, and a threaded nut-bolt assembly designated generally by the numeral 40.

First member 20 is channel shaped in configuration having a base portion 25 and a pair of laterally spaced and parallel end members 27 upwardly extending from the base portion. The member may be made of any suitable material, with iron or steel being preferred because of strength as well as cost efficiency. The base portion includes a substantially planar top surface and includes an aperture 29, preferably square in shape, for receiving threaded bolt 43.

Figure 4:
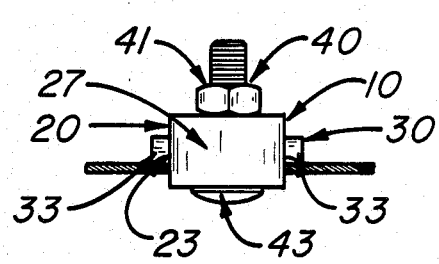
FIG. 4 is a side elevation of the wire clamp shown in a clamped position.

Second member 30, like the first member, may be constructed of any suitable material, iron or steel being preferred. The second member 30 includes a body portion 35 dimensioned to a width for being received within the channel created by end members 27 of first member 20. Body portion 35 is preferably flat, having a planar undersurface for engaging wires, designated by the numerals 7 and 9, and includes a centrally located aperture 39 for receiving bolt 43. Aperture 39 is in registry with aperture 29 of first member 20 when in the clamping position. The second member is provided with a pair of parallel and laterally spaced ears 33 downwardly depending from the body portion. The length of the body portion is such that each ear overlaps a respective edge 23 of base portion 25 of first member 20, as may be seen to advantage in FIG. 4. Each ear is provided with a sharpened edge 34 for biting into the wire.

Nut-bolt assembly 40 includes a threaded bolt 43 preferable having a square neck or shoulder 47 which is received within the square aperture 29 of first member 20 to prevent rotation of the bolt when threaded nut 41 is tightened on the bolt.

For operation, nut 41 is loosened upon bolt 43 so that second member 30 loosely engages first member 20. The free or broken end of one wire, for example wire 7, is then placed between the base portion 25 of first member 20 and the body portion 35 of second member 30 with the free end of the wire extending a short distance over one of the edges 23 of the base portion. The free or broken end of the second portion, wire 9, is then pulled tightly through and between the first and second members and nut 41 is screwed upon bolt 43 causing the bottom surface of body portion 35 of the second member and the top surface of base portion 25 of the first member to clamp tightly on the two wires. The two wires are prevented from lateral movement during the clamping operation by the end walls 27 of first member as well as bolt 43 which separates the two wires. Further tightening of the nut upon the bolt causes a crimping of the edge portions of the wires over respective edges 23 of first member 20. The ears apply a force upon the wires which is substantially transverse to the force being applied between the base portion of the first member and the body portion of the second member, to further prevent slippage. Where the ears have a sharpened edge, the edge of the ears bite into the wires to form an indentation which also strengthens the clamping action for preventing slippage. The time for mending the fence is reduced to only a minute or two.

Having thus described in detail a preferred embodiment of the present invention, it is to be appreciated and will be apparent to those skilled in the art that other physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes that come within the meaning and range of equivalency of the claims are therefore to be embraced therein.

I claim:

1. A wire clamp comprising:

first member, channel-shaped, having a base portion provided with a bolt receiving aperture and having a pair of parallel and laterally spaced end members upwardly extending substantially transverse to said base portion;

a second member having a body portion dimensioned for reception within the channel defined by the end members of said first member, said body portion cooperating with said base portion of said first member for clamping together wires placed therebetween, said body portion having a bolt receiving aperture in registry with the aperture of said first member, and said second member having a pair of laterally spaced ears downwardly depending from said body portion, said ears overlapping the edges of the base portion of said first member for crimping two or more wires placed therebetween and said ears including sharpened edges for engaging the wires for preventing slippage thereof; and a threaded nut and bolt assembly, the bolt of said assembly receivable within the apertures of said first and second members and the nut of said assembly threadable upon said bolt to clamp said first member to said second member for retaining and crimping wires placed therebetween.

2. The apparatus as described in claim 1 wherein said bolt includes a square neck portion and wherein at least one of said apertures of said first or second member is square in configuration for receiving the square neck portion of said bolt to prevent rotation thereof.

* * * * *